(12) United States Patent
Heckmeier et al.

(10) Patent No.: US 6,376,030 B1
(45) Date of Patent: Apr. 23, 2002

(54) NEMATIC LIQUID-CRYSTAL COMPOSITION, AND LIQUID-CRYSTAL DISPLAY USING SAME

(75) Inventors: Michael Heckmeier, Bensheim; Marcus Reuter, Darmstadt, both of (DE)

(73) Assignee: Merck Patent Gesellschaft mit beschrankter Haftung, Darmstadt (DE)

( * ) Notice: Subject to any disclaimer, the term of this patent is extended or adjusted under 35 U.S.C. 154(b) by 0 days.

(21) Appl. No.: 09/394,878

(22) Filed: Sep. 13, 1999

(30) Foreign Application Priority Data

Sep. 12, 1998 (DE) .......................................... 198 41 832

(51) Int. Cl.[7] .................... C09K 19/52; C09K 19/34; C09K 19/30; C09K 19/20; C09K 19/12

(52) U.S. Cl. ............... 428/1.1; 252/299.01; 252/299.61; 252/299.63; 252/299.64; 252/299.65; 252/299.66; 252/299.67

(58) Field of Search ........................ 252/299.01, 299.63, 252/299.61, 299.64, 299.65, 299.66, 299.67; 428/1.1

(56) References Cited

U.S. PATENT DOCUMENTS 5,384,065 A * 1/1995 Geelharr et al. ....... 252/299.63
5,599,480 A * 2/1997 Tarumi et al. ......... 252/299.63
5,965,060 A * 10/1999 Tarumi et al. ......... 252/299.63
6,027,665 A * 2/2000 Pausch et al. ......... 252/299.61
6,067,141 A * 5/2000 Yamada et al. .............. 349/129
6,174,572 B1 * 1/2001 Hirschmann et al. ........ 428/1.1

FOREIGN PATENT DOCUMENTS

DE 4226298 * 2/1993

OTHER PUBLICATIONS

CAPLUS 1994: 204407, 1994.*
CAPLUS 1993: 614090, 1993.*

* cited by examiner

*Primary Examiner*—Shean C. Wu
(74) *Attorney, Agent, or Firm*—Millen, White, Zelano & Branigan, P.C.

(57) ABSTRACT

Nematic liquid-crystal compositions of negative dielectric anisotropy comprising compounds of the formula I

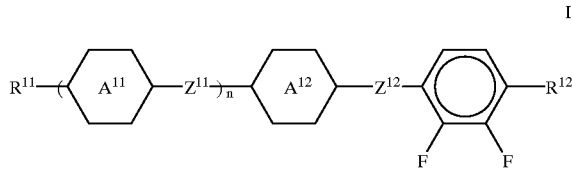

are useful in plasma-addressed liquid-crystal displays.

39 Claims, No Drawings

NEMATIC LIQUID-CRYSTAL COMPOSITION, AND LIQUID-CRYSTAL DISPLAY USING SAME

The invention relates to nematic liquid-crystal compositions of negative dielectric anisotropy (Δ∈) based on substituted 2,3-difluorophenylene, in particular based on substituted 4-(trans-1,4-cyclo-hexylene)-2,3-difluorophenylene, and substituted trans-4-(trans-1,4-cyclohexylene) cyclohexylenecarboxylic esters. These compositions are particularly suitable for plasma-addressed display devices.

Plasma-addressed displays (PADs) are of great utility for economically interesting high-information displays. Such PADs are used, for example, in TV applications and, for example in displays for computer screens, automobiles and aircraft.

PADs have electrical switching elements and a plasma cell with a plurality of addressing channels which is connected to the display cell. Such PADs are disclosed, for example, in WO 96/00925, EP 0 628 944, EP 0 545 569, U.S. Pat. No. 4,896,149 and U.S. Pat. No. 5,077,553.

In a PAD, the switching elements are addressed by means of a time multiplexing scheme. This charges the electrodes of a pixel in the limited time during which they are active. They subsequently become and remain inactive until they are addressed again in the next cycle. Consequently, the change in voltage at a plasma-addressed pixel in this inactive time is a not undesired, but very crucial characteristic of such a display. Discharge of the electrodes of the pixel is determined by two factors, namely the capacitance of the pixel (C) and the specific resistance of the liquid-crystal material between the electrodes (R), i.e. of the liquid crystal. The time constant for the experimental drop in voltage is proportional to RC and is known as the RC time.

PADs make particular demands of the dielectric properties of the liquid-crystal compositions. Both Δ∈, as in conventional TFT-AMDs, and ∈$_{||}$ and ∈$_{⊥}$ are of crucial importance here. This applies both to PADs in TN mode and in particular to those in ASM mode. Since PADs can be produced in considerably larger screen diagonals compared with conventional active matrix displays (AMDs) with, for example, thin-film transistors (TFTs) as active switching elements, they are suitable, as the first liquid-crystal displays ever, for achieving the long-held target of a wall-hung TV set (Buzak, Information Display 4 & 5 (1998, pp. 22 ff.). TV sets with PADS having a 25 inch diagonal are commercially available and prototypes of displays with a 42 inch screen diagonal have already been produced (Burgmans, Kakizaki and Uede, Information Display 4 & 5 (1998), pp. 14 ff.). With these large screen diagonals, the problem of the relatively high dependence of the contrast and the hue on the viewing angle, often abbreviated to the viewing angle dependence, of the conventionally utilized effect of the twisted nematic (TN) cell becomes predominant. At least with these screen diagonals, but generally already for screen diagonals in the range from 17 to 20 inches, the viewing-angle dependence of TN displays is prohibitive for market success. For this reason, work has been in progress for some time on various solutions for improving the viewing-angle dependence. For PADs, the use of the so-called axially symmetrically aligned microcell (ASM), which allows a viewing-angle range of 140° both horizontally and vertically, is particularly suitable (Burgmans et al.). In particular for ASM-PADs, dielectrically negative liquid-crystal media are suitable. It is now been found that liquid-crystal materials of negative dielectric anisotropy are suitable for ASM-PADs.

It has been found that liquid crystals of negative Δ∈ are particularly suitable for PADs in ASM mode.

There is thus a great demand for liquid-crystal compositions having high specific resistance and other material properties suitable for use in PADs, in particular in. ASM-PADs, such as, for example, a broad nematic mesophase range with an extremely low smectic-nematic transition temperature and no crystallization at low-temperature, and negative dielectric anisotropy.

A further requirement in such compositions is for a low steepness of the characteristic lines (large difference between $V_{90}$ and $V_{10}$) for addressing grey shades, where a greater addressing voltage, for example compared with TN-AMDs, can be accepted.

An object of the invention is to provide liquid-crystal compositions of very high specific resistance which also satisfy the other requirements.

Upon further study of the specification and appended claims, further objects and advantages of this invention will become apparent to those skilled in the art.

An additional requirement is for compositions of low An values of ≦0.1, preferably ≦0.09, particularly preferably ≦0.08, and rotational viscosities of ≦150 mpa·s at 20° C., preferably ≦120 mPa·s, in particular ≦100 mPa·s.

It has now been found that nematic liquid-crystal compositions for plasma-addressed liquid-crystal displays (PALCDs) comprising at least one compound of the formula I

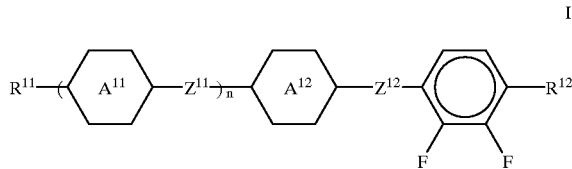

in which $R^{11}$ and $R^{12}$, independently of one another, are alkyl or alkoxy having 1 to 8, preferably 1 to 5, carbon atoms or alkenyl, alkenyloxy or alkoxyalkyl having 2 to 8, preferably 2 to 5, carbon atoms, $Z^{11}$ and $Z^{12}$, independently of one another, and if more than one $Z^{11}$ are present, these too independently of one another, are a single bond, —(CH$_2$)$_2$—, trans—CH=CH— or —CH$_2$O—, $A^{11}$ and $A^{12}$, independently of one another, and if more than one $A^{11}$ are present, these too independently of one another, are trans-1,4-cyclohexylene, 1,4-cyclohexenylene, in which, in addition, 1 or 2 non-adjacent —CH$_2$— groups may be replaced by oxygen atoms, 1,4-phenylene, 2-fluoro-1,4-phenylene, 3-fluoro-1,4-phenylene, 2,3 difluoro-1,4-phenylene, 3,5-difluoro-1,4-phenylene, 2,6-difluoro-1,4-phenylene or 1,5-pyridyl or 1,5-pyrimidyl, in which one or two H atoms may be replaced by F, where preferably at least one of the rings $A^{11}$ and $A^{12}$ is a trans-1,4-cyclohexylene ring and particularly preferably two of the rings $A^{11}$ and $A^{12}$ are trans-1,4-cyclohexylene, and n is 0, 1 or 2, preferably 0 or 1, are particularly suitable for PAD applications.

In PADs, very high values for the RC time, i.e. the time constant for discharge of the pixel electrodes, can be achieved. The high values for the RC time, or the voltage holding ratio, which corresponds to this quantity, are achieved on one hand by a thin installation sheet, but on the other hand are also determined essentially by the type and composition of the liquid-crystal material used. These compositions likewise have reduced viscosity and exhibit no crystallization and no smectic phases at temperatures down to −20° C., preferably at temperatures down to −30° C., particularly preferably at temperatures down to −40° C., when stored in test TN-cells with a layer thickness corresponding to an optical retardation of about 0.5 μm format least 100 hours. They can preferably be stored for at least 500 hours, very particularly preferably for at least 1000 hours.

Preference is furthermore given to liquid-crystal mixtures comprising at least one compound of the formula II

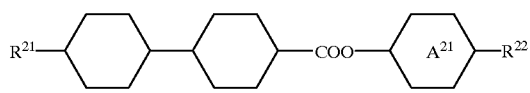

in which
R$^{21}$ and R$^{22}$, independently of one another, are alkyl or alkyloxy having 1 to 8, preferably 1 to 5, carbon atoms or alkenyl, alkenyloxy or alkoxyalkyl having 2 to 8, preferably 2 to 5, carbon atoms, and
A$^{21}$ is trans-1,4-cyclohexylene, 1,4-phenylene, 3-fluoro-1,4-phenylene, 2-fluoro-1,4-phenylene or 2,3-difluoro-1,4-phenylene.

Particular preference is given to nematic liquid-crystal compositions which comprise at least one compound of the formula III

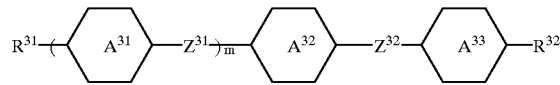

in which
R$^{31}$ and R$^{32}$, independently of one another, are alkyl or alkyloxy having 1 to 8, preferably 1 to 5, carbon atoms or alkenyl, alkenyloxy or alkoxyalkyl having 2 to 8, particularly preferably 2 to 5, carbon atoms,

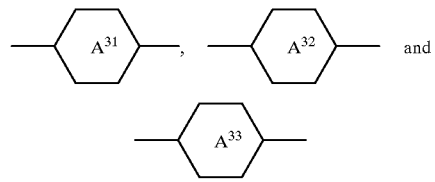

are each, independently of one another,
and, if more than one

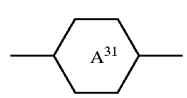

is present, these too independently of one another, are trans-1,4-cyclohexylene, 1,4-phenylene, 3-fluoro-1,4-phenylene or 2-fluoro-1,4-phenylene, and Z$^{31}$, Z$^{32}$ and Z$^{33}$, each independently of one another, and, if more than one Z$^{31}$ are present, these too independently of one another, are CH$_2$CH$_2$, COO, OCO, CH$_2$O, OCH$_2$ or a single bond, and
m is 0, 1 or 2, with the proviso that m is not 1 at the same time as

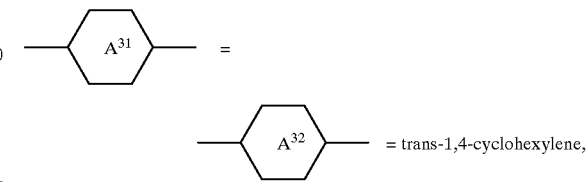

Z$^{31}$ is a single bond and Z$^{32}$ is COO.

Particularly preferably, m=0 or 1, Z$^{32}$ and, if present, Z$^{31}$ are a single bond

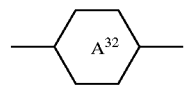

and

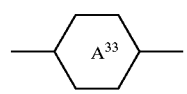

and, if present,

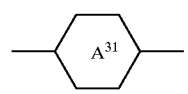

are trans-1,4-cyclohexylene or 1,4-phenylene.

The liquid-crystal composition very particularly preferably comprises one or more compounds selected from the group of compounds of the formulae III1 to III2

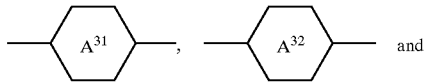

in which the parameters are as defined above for the formula III and are preferably Z$^{32}$ and Z$^{33}$, independently of one another, are —CH$_2$CH$_2$— or a single bond,

are each, independently of one another, trans-1,4-cyclohexylene or 1,4-phenylene, and one of these rings is alternatively 2-fluoro-1,4-phenylene or 3-fluoro-1,4-phenylene, and/or a compound of the formula III3

$$R^{31}\!-\!\!\boxed{A^{31}}\!-\!Z^{31}\!-\!\boxed{A^{31}}\!-\!Z^{31}\!-\!\boxed{A^{32}}\!-\!Z^{32}\!-\!\boxed{A^{33}}\!-\!R^{32} \quad \text{III3}$$

in which the parameters are as defined above for the formula III and are preferably one of $Z^{31}$ and $Z^{32}$ is —CH$_2$CH$_2$—, —COO— or a single bond and the other is a single bond, and

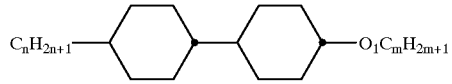

are trans-1,4-cyclohexylene or 1,4-phenylene.

The mixture particularly preferably comprises one or more compounds selected from the group consisting of the compounds III1a to III1d:

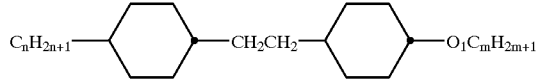

III1a

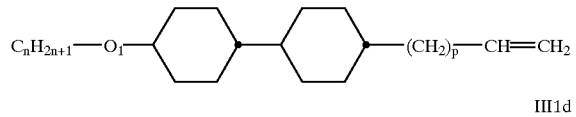

III1b, III1c, III1d in which, in each case independently of one another,
n and m are an integer from 1 to 7, preferably from 1 to 5,
l is 0 or 1, preferably 0, and
p and q are each independently an integer from 0 to 3, preferably 0 or 1.

Preference is furthermore given to mixtures comprising compounds selected from the group consisting of the compounds of the formulae III2a to IIIc and/or III2b to III2g and/or III2h to III2i:

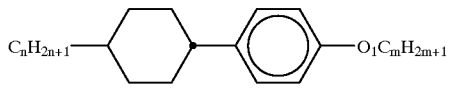

III2a

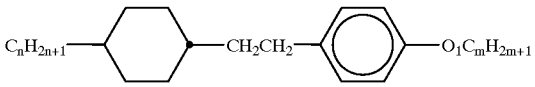

III2b

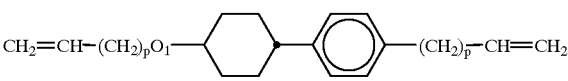

III2c

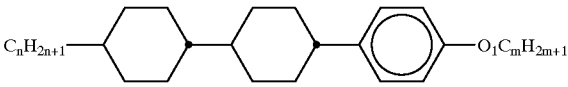

III2d

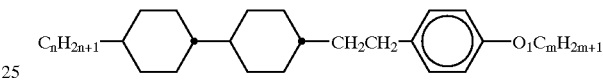

III2e

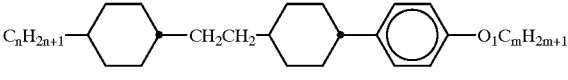

III2f

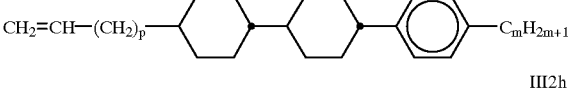

III2g

III2h

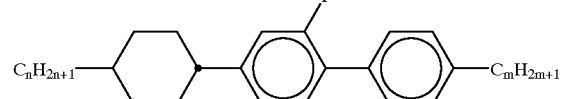

III2i in which n, m, p and l are each as defined above for the formulae III1a to III1d.

Preference is also given to mixtures comprising one or more compounds from the group consisting of the compounds of the formulae III3a to III3d:

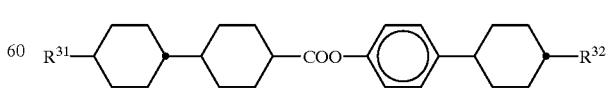

III3a

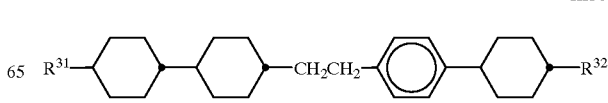

III3b

-continued

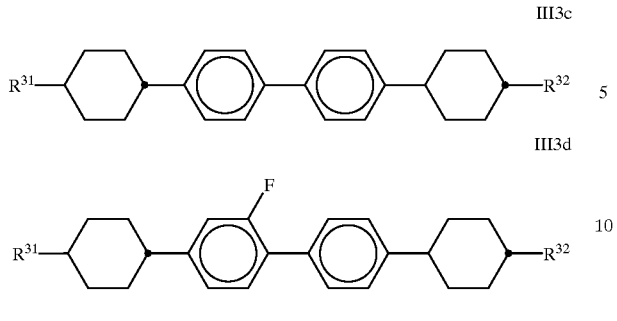

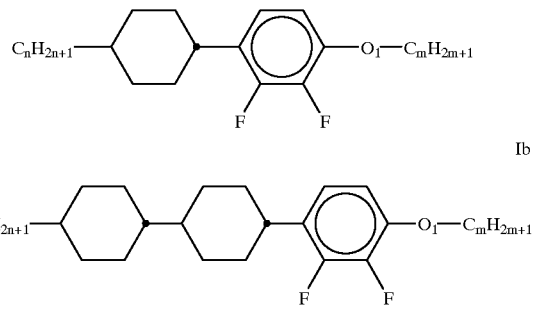

in which the parameters are as defined for the formula III.

The mixtures particularly preferably comprise:

a) one or more compounds of the formula III1a, in which l is preferably 1, and/or b) one or more compounds of the formula III1a in which l is 0 and one or more compounds of the formula III1a in which l=1;

c) one or more compounds of the formula III1c and/or III1d, but preferably of the formula III1c, in which l is preferably 0;

d) one or more compounds of the formula III2h, e) one or more compounds of the formula III3a in which $R^{31}$ and $R^{32}$ are preferably alkyl having 1 to 5 carbon atoms;

f) one or more compounds of the formula IIa and/or IId, described below;

g) one or more compounds of the formula IIa, described below;

h) one or more compounds of the formula IId, described below;

Preference is furthermore given to nematic liquid-crystal compositions which, besides two or more compounds of the formula I, comprise at least one compound of the formula II:

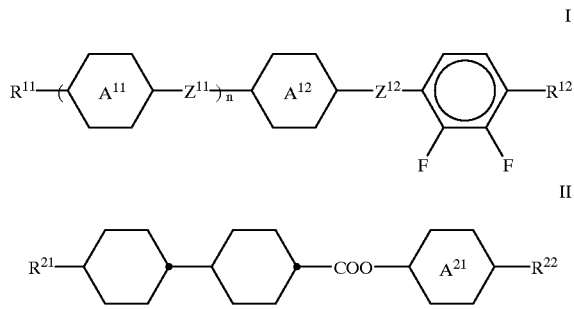

in which the parameters are as defined above for the respective formulae.

In a preferred embodiment, the compositions according to the invention comprise a total of from 30% to 70%, preferably from 40% to 65%, of two or more, preferably from three to seven, compounds of the formula I.

The nematic compositions particularly preferably comprise at least two compounds of the formula I selected from the group consisting of the formulae Ia to Ib:

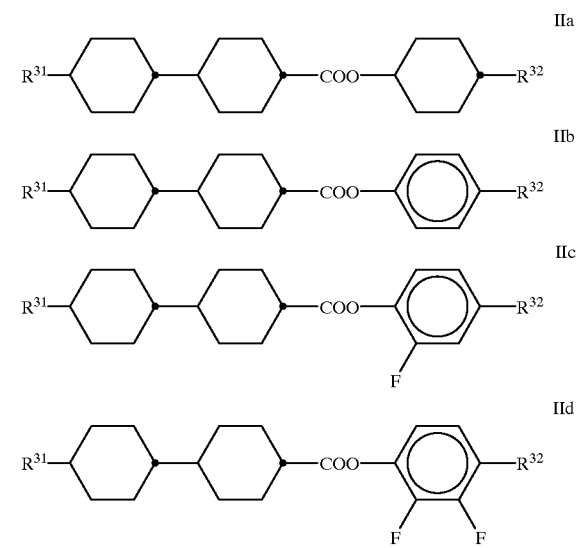

in which, each independently of one another, n and m are an integer from 1 to 7, preferably from 1 to 5, and l is 0 or 1, preferably 0.

The nematic compositions preferably comprise at least one compound selected from the group consisting of the compounds of the formulae IIa to IId:

in which $R^{31}$ and $R^{32}$ are as defined above for the formula II, but are preferably n-alkyl having 1 to 5 carbon atoms.

The LC compositions according to the invention have a dielectric anisotropy, measured at 20° C. and 1 kHz, of from −2.0 to −5.0, preferably between −2.5 and −4.3, in particular from −2.9 to −3.9. $\epsilon_\parallel$ is preferably from 2.5 to 4, particularly preferably from 3.0 to 3.8, very particularly preferably from 3.1 to 3.7. The liquid-crystal compositions according to the invention have a birefringence of not more than 0.1, preferably not more than 0.093, particularly preferably not more than 0.08, very particularly preferably not more than 0.076, at 20° C. and 589 nm. The voltage holding ratio (VHR), measured after 5 minutes at 100° C. and at a measurement voltage of 1 V using an Autronic Melchers measuring instrument in TN test cells with a layer thickness of about 5 $\mu$m with AL-1041 (Nissan Chemicals, Japan) as alignment layer, is, in a preferred embodiment, at least 83%, preferably at least 90%, particularly preferably at least 95%. In this embodiment, the RC time in the finished PAD is significantly increased, in a preferred manner, by the thin sheet. In another preferred embodiment, in which the improvement in the RC time in the PAD is optional, the voltage holding ratio in said TN test cells is at least 98%, preferably greater than 98.5%, particularly preferably greater than 99.0%, very particularly preferably at least 99.5%. The clearing point of the compositions according to invention is above 75° C., in particular above 80° C., very particularly above 90° C.

Compositions of this type preferably comprise two, three or four compounds of the formula I. Preferred compositions comprise at least 10% by weight or more of each of the individual compounds of the formula I.

The compounds of the formulae I, II and III are known to the person skilled in the art. See, e.g., U.S. Pat. No. 4,229,315 and U.S. Pat. No. 5,087,764.

Preferred compositions likewise comprise two or more compounds of the formulae III. Preference is given here to the compounds from the group consisting of the formulae III selected from the formulae IIIa and IIIb:

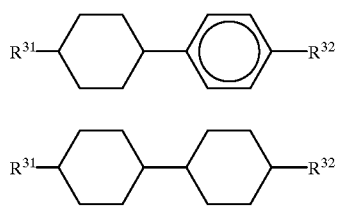

where $R^{31}$ and $R^{32}$ are as defined above for the formula III and are preferably, each independently of one another, alkyl having 3 to 5 carbon atoms.

In a preferred embodiment, the compositions according to the invention comprise at least two compounds of the formula IIIb.

The compositions according to a further preferred embodiment of the present invention comprise from 6 to 48% by weight, in particular from 10 to 34% by weight or from 16 to 30% by weight, of components of the formula I, based on the mixture as a whole. The proportions of the other groups in per cent by weight is preferably in the following ranges:

formula II: from 0 to 30%, in particular from 3 to 30%
formula III: from 10 to 60%, in particular from 20 to 50%.

The components of the formulae I, II and III preferably form the basis of the claimed compositions and together make up at least 80% by weight, particularly preferably at least 90% by weight, of the compositions. However, it is likewise possible to use other LC components in smaller percentages in addition to the components of the formulae I to III in order to fine-tune the claimed compositions. Particular use is made here of compounds of high clearing point and/or high birefringence.

The liquid-crystal compositions according to the invention can, if necessary, also comprise further additives, such as, for example, dichroic dyes and in particular chiral dopants, in conventional amounts. The concentrations of these further additives are 0–10% in total, preferably from 0.1 to 5% in total, in particular from 0.1 to 3% per compound employed, in each case based on the mixture as a whole. The concentration of these additives is not taken into account when indicating the composition of the liquid-crystal mixture and in the rules for setting the dimensioning of their concentration ranges.

The nematic liquid crystal compositions of the present invention preferably comprise a) two or more compounds of the formula I in which n=0, $R^{11}$ is alkyl and $R^{12}$ is alkoxy, b) two or more compounds of the formula I in which n=1, $R^{11}$ is alkyl and $R^{12}$ is alkoxy, c) one or more compounds of the formula I in which n=0, $R^{11}$ is alkyl and $R^{12}$ is alkoxy, and one or more compounds of the formula I in which n=1, $R^{11}$ is alkyl and $R^{12}$ is alkyl or alkoxy, d) one or more compounds of the formula I in which n=0, $R^{11}$ is alkyl and $R^{12}$ is alkoxy, and one or more compounds of the formula I in which n=1, $R^{11}$ is alkyl and $R^{12}$ is alkoxy, e) one or more compounds of the formula I in which n=0, $R^{11}$ is alkyl and $R^{12}$ is alkoxy, one or more compounds of the formula I in which n=1 and $R^{11}$ and $R^{12}$ are alkyl, and one or more compounds of the formula I in which n=1, $R^{11}$ is alkyl and $R^{12}$ is alkoxy, f) one or more compounds of the formula IIa and/or IId, g) one or more compounds of the formula IIa, h) one or more compounds of the formula IId, i) one or more compounds of the formula III1a, j) one or more compounds of the formula IIIa, k) one or more compounds of the formula IIIb, l) one or more compounds of the formula III1a and one or more compounds of the formula IIIa, m) one or more compounds of the formula III1a, one or more compounds of the formula IIIa and one or more compounds of the formula IIIb, n) one or more compounds of the formula I, one or more compounds selected from the group consisting of the formulae IIa and IId and one or more compounds selected from the group consisting of the compounds of the formulae III1a, III1c, III1d, III2a, IIIa and IIIb, or o) one or more compounds of the formula III1c, particularly preferably with l=0, n=1 to 5, and p=0, 1, 2 or 3, of these preferably p=0.

In general, the compositions consist of a plurality of compounds mixed in a conventional manner. In general, the desired amount of the components used in a lesser amount are dissolved in the components making up the principal constituent, advantageously at elevated temperature. If the selected temperature is above the clearing point of the principal constituent, completion of the dissolution process is particularly easy to observe.

However, it is also possible to prepare mixtures in other known ways, for example by using so-called pre-mixes, for example homologue mixtures, or multibottle systems.

By means of suitable additives, the liquid-crystal phases according to invention can be modified in such a way that they can be used in any type of ASM-PAD that has been disclosed hitherto.

Unless stated otherwise, all temperatures above and below, thus including, in the examples, the melting point, the smectic-nematic phase transition temperature and the clearing point of a liquid-crystal substance, are given in ° C., the temperature differences are given in differential degrees Celsius, the percentages are per cent by weight, and the physical properties are the values at 20° C.

In order to characterize the liquid-crystalline compounds used in the compositions according to invention, the following abbreviations are used in the examples. The indices n and m denote the number of carbon atoms present in the terminal alkyl radicals.

In the present application and in the examples below, the structures of the liquid-crystal compounds are indicated by means of acronyms, the transformation into chemical formulae taking place in accordance with Tables A and B below. All radicals $C_nH_{2n+1}$ and $C_mH_{2m+1}$ are straight-chain alkyl radicals having n and m carbon atoms respectively.

The coding in Table B is self-evident. In Table A, only the acronym for the parent structure is given. In individual cases, the acronym for the parent structure is followed, separated by a dash, by a code for the substituents $R^1$, $R^2$, $L^1$, $L^2$ and $L^3$.

| Code for $R^1$, $R^2$, $L^1$, $L^2$ | $R^1$ | $R^2$ | $L^1$ | $L^2$ | $L^3$ |
|---|---|---|---|---|---|
| nm | $C_nH_{2n+1}$ | $C_mH_{2m+1}$ | H | H | H |
| nOm | $C_nH_{2n+1}$ | $OC_mH_{2m+1}$ | H | H | H |
| nO.m | $OC_nH_{2n+1}$ | $C_mH_{2m+1}$ | H | H | H |
| n | $C_nH_{2n+1}$ | CN | H | H | H |
| nN.F | $C_nH_{2n+1}$ | CN | H | F | H |
| nF | $C_nH_{2n+1}$ | F | H | H | H |
| nOF | $OC_nH_{2n+1}$ | F | H | H | H |
| nF.F | $C_nH_{2n+1}$ | F | H | F | H |
| nCl | $C_nH_{2n+1}$ | Cl | H | H | H |
| nmF | $C_nH_{2n+1}$ | $C_mH_{2m+1}$ | F | H | H |
| nCF$_3$ | $C_nH_{2n+1}$ | CF$_3$ | H | H | H |
| nOCF$_3$ | $C_nH_{2n+1}$ | OCF$_3$ | H | H | H |
| nOCF$_3$.F | $C_nH_{2n+1}$ | OCF$_3$ | F | H | H |
| nOCF$_2$ | $C_nH_{2n+1}$ | OCHF$_2$ | H | H | H |
| nOCF$_2$.F | $C_nH_{2n+1}$ | OCHF$_2$ | F | F | H |
| nS | $C_nH_{2n+1}$ | NCS | H | H | H |
| rVsN | $C_rH_{2r+1}$—CH=CH—$C_sH_{2s}$— | CN | H | H | H |
| rEsN | $C_rH_{2r+1}$—O—$C_sH_{2s}$— | CN | H | H | H |
| nAm | $C_nH_{2n+1}$ | $COOC_mH_{2m+1}$ | H | H | H |
| nF.Cl | $C_nH_{2n+1}$ | Cl | H | F | H |
| nmFF | $C_nH_{2n+1}$ | $C_mH_{2m+1}$ | F | H | F |
| nOmFF | $C_nH_{2n+1}$ | $OC_mH_{2m+1}$ | F | H | F |

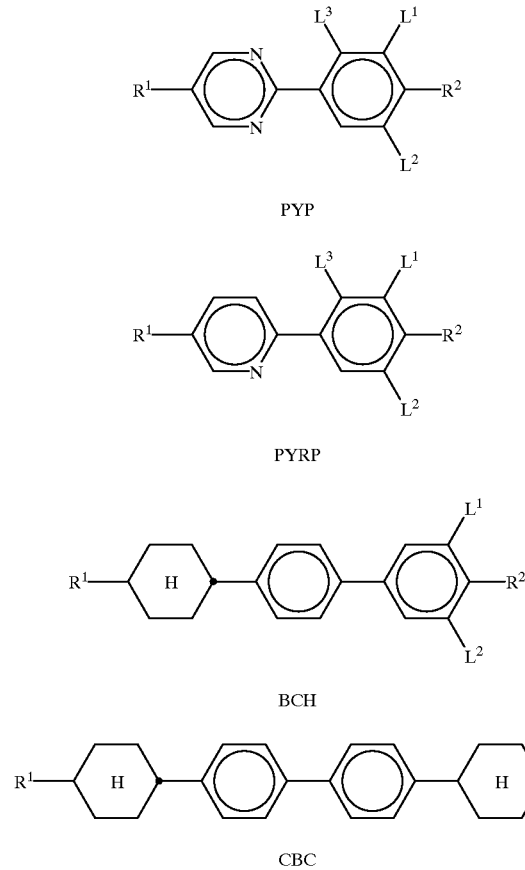

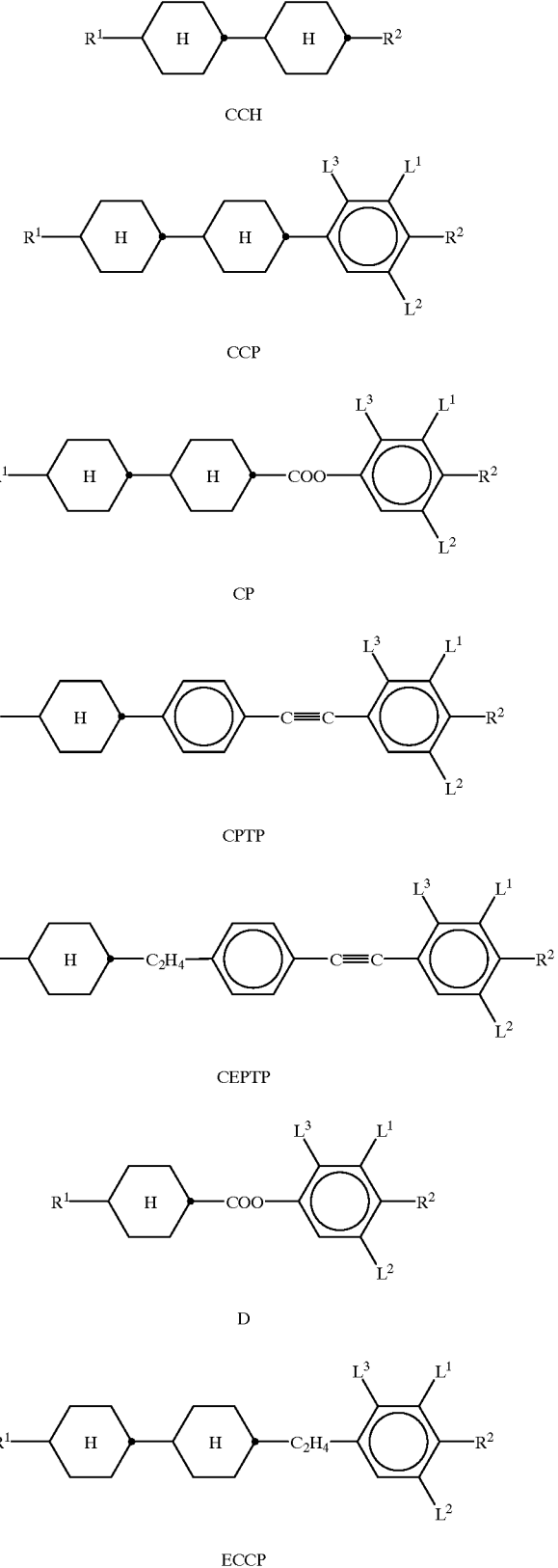

TABLE A-continued
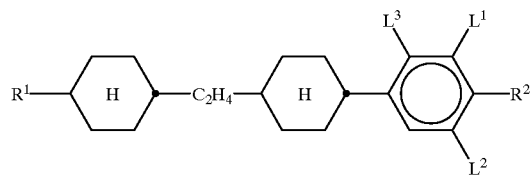
CECP
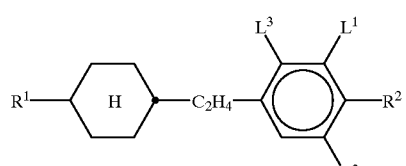
EPCH
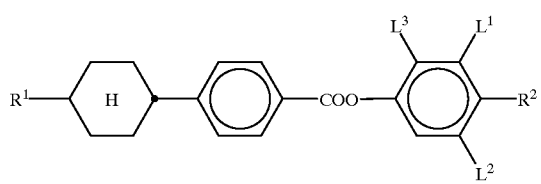
HP
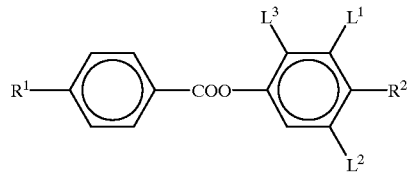
ME
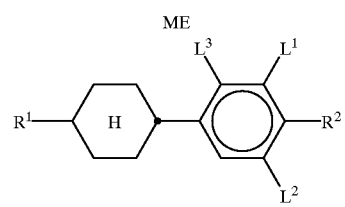
PCH
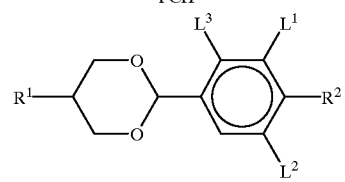
PDX
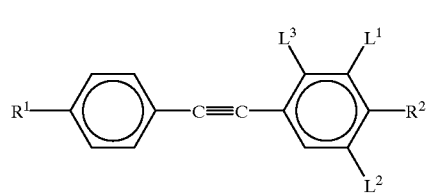
PTP
TABLE A-continued
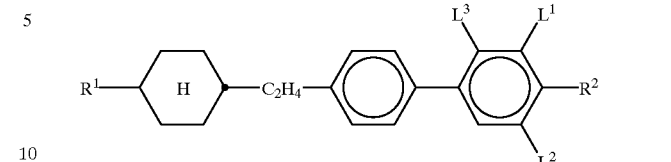
BECH
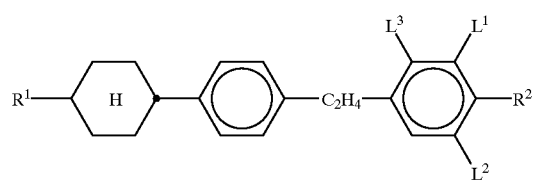
EBCH
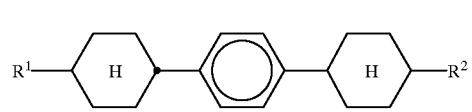
CPC
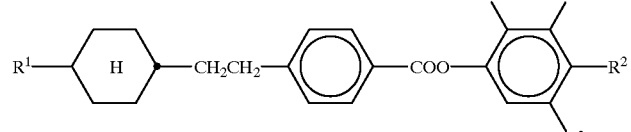
EHP
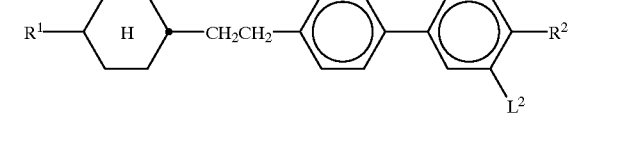
BEP
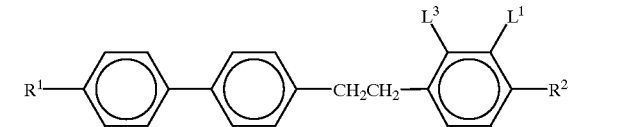
ET TABLE B
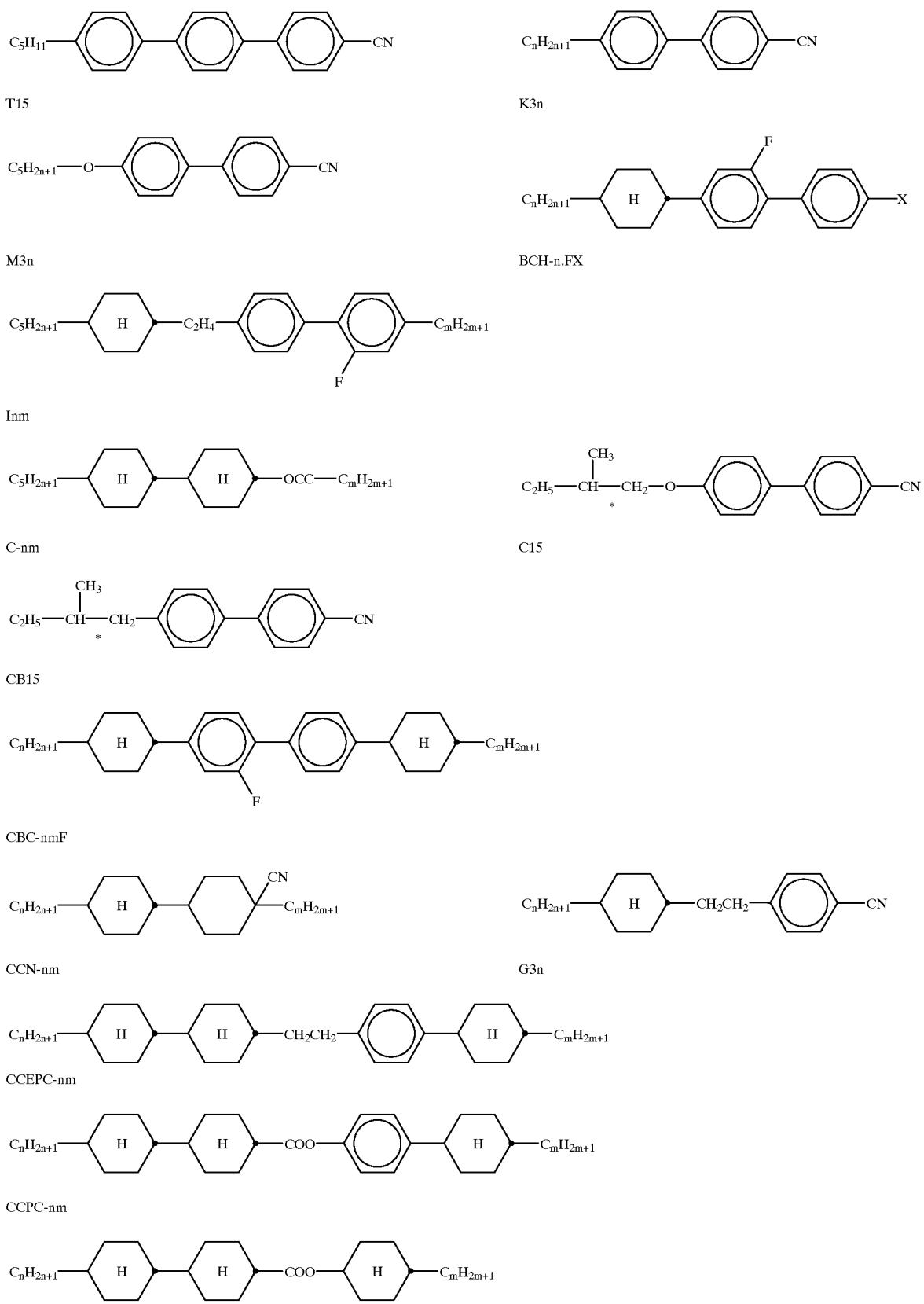

TABLE B-continued
CH-nm
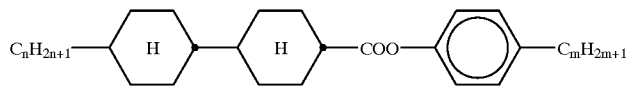
CP-nm
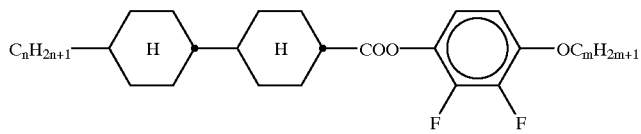
CP-nOmFF
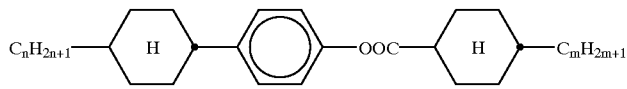
HD-nm
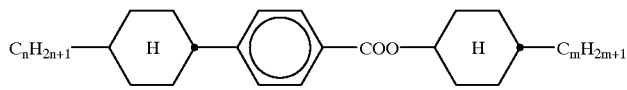
HH-nm
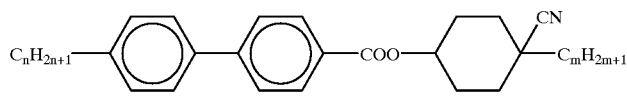
NCB-nm
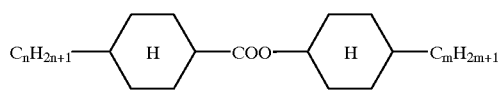
OS-nm
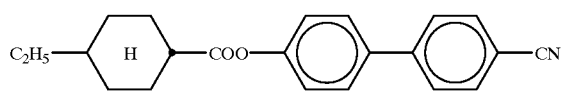
CHE
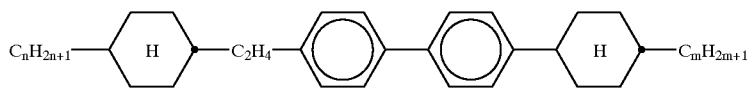
ECBC-nm
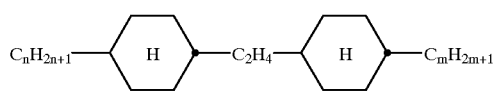
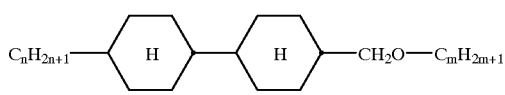
ECCH-nm
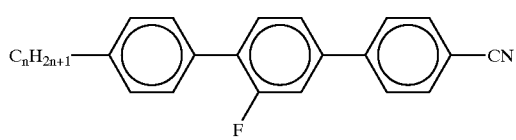
CCH-n1EM
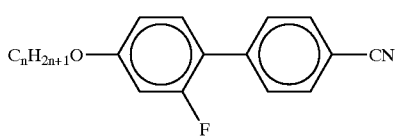

TABLE B-continued
T-nFN
B-nO.FN
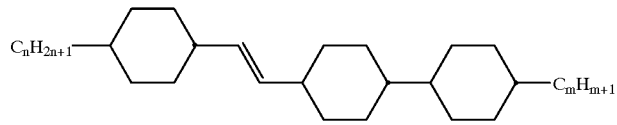
CVCC-n-m
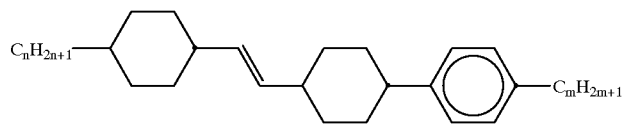
CVCP-n-m
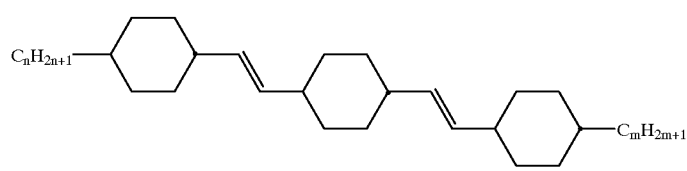
CVCVC-n-m
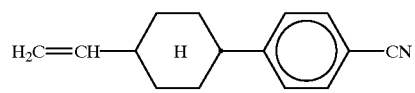
CP-V-N
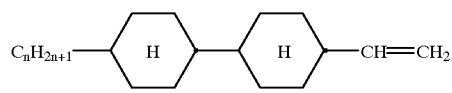
CC-n-v
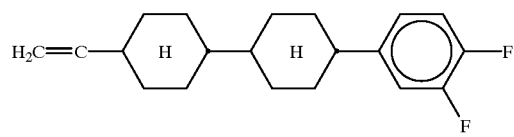
CCG-V-F
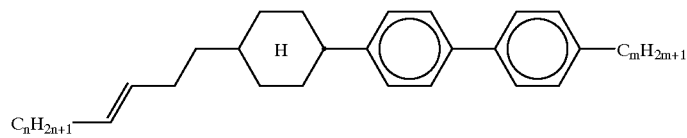
CPP-nV2-m
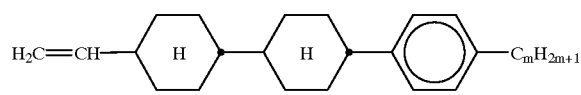

TABLE B-continued
CCP-V-m
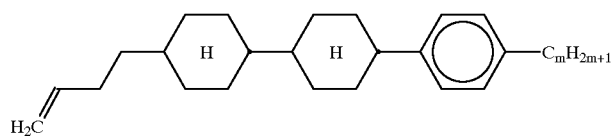
CCP-V2-m
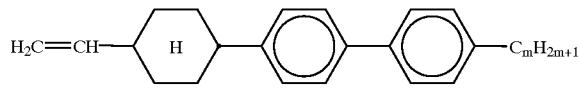
CPP-V-m
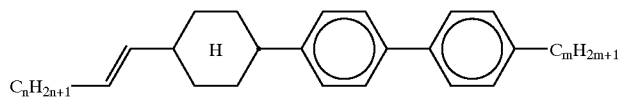
CPP-nV-m
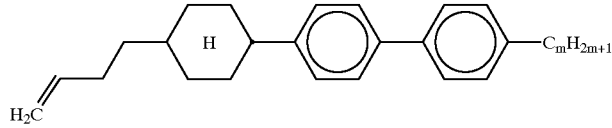
CPP-V2-m
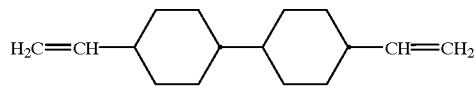
CC-V-V
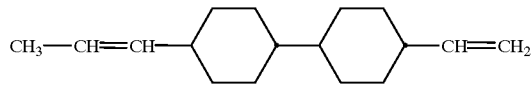
CC-1V-V
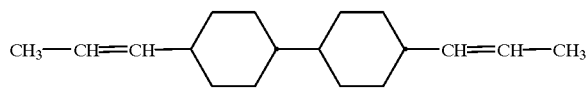
CC-1V-V1
CC-2V-V
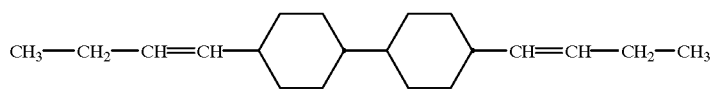
CC-2V-V2
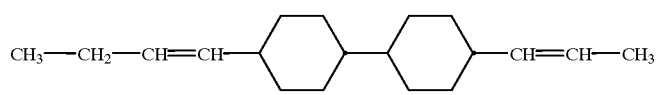

TABLE B-continued

CC-2V-V1

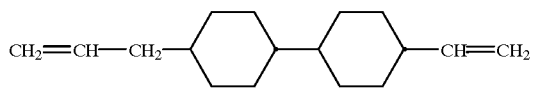

CC-V1-V

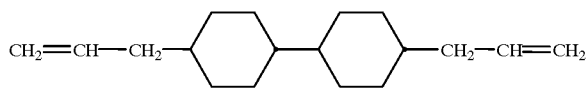

CC-V1-1V

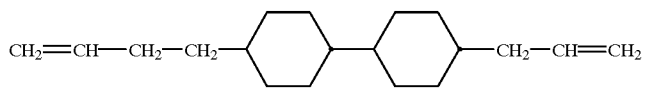

CC-V2-1V

The physical properties of the liquid-crystal mixtures were determined as described in "Physical Properties of Liquid Crystals", Ed. M. Becker, Merck KGaA, as of Nov. 1997, unless explicitly stated otherwise.

The following examples are intended to illustrate the invention without representing a limitation. Above and below, percentages are per cent by weight. All temperatures are all given in degrees Celsius. $\Delta n$ denotes the optical anisotropy (589 nm, 20° C.), $\Delta \in$ the dielectric anisotropy (1 kHz, 20° C.), H.R. the voltage holding ratio (at 100° C., after 5 minutes in an oven at 1 V), $V_0$ the capacitive threshold voltage determined at 20° C. and 1 kHz. The low-temperature stability of the nematic liquid-crystal compositions was investigated by storage tests in sealed TN cells with a layer thickness of about 5 µm. The alignment layer used was CU-1511 from Merck DuPont, USA. The test cells were bonded to polarizers for easier observations of the phase behavior and stored in storage cabinets at certain temperatures (−20° C., −30° C. or −40° C.). The cells were assessed visibly for phase conversion or structural changes at intervals of about 24 hours. The figure given for the storage stability $t_{store}$ (T) was the time of the final observation just before any change was evident.

The entire disclosure of all applications, patents and publications, cited above, and of corresponding Germany patent application No. 19841832.9, filed Sep. 12, 1998 is hereby incorporated by reference.

EXAMPLES

Example 1

A mixture of the following composition was prepared and investigated for usability in PALCDs.

| Abbreviation | % by wt. |
| --- | --- |
| PCH-302FF | 4.0 |
| PCH-502FF | 12.0 |
| CCP-302FF | 15.0 |
| CCP-502FF | 15.0 |
| CCP-31FF | 12.0 |
| CCH-34 | 17.0 |
| CCH-301 | 10.0 |
| CCH-501 | 15.0 |
| | 100.0 |

This composition has the following properties:

| | |
| --- | --- |
| T(N, I) | 85° C. |
| $\Delta n$ (20° C., 589 nm) | 0.073 |
| $\Delta \epsilon$ (20° C., 1 kHz) | −3.1 |
| $\epsilon_\parallel$ (20° C., 1 kHz) | 3.3 |
| $K_1$ (20° C.) | 15.7 × 10$^{-12}$N |
| $K_3/K_1$ (20° C.) | 1.03 |
| $V_0$ (20° C.) | 2.41 V |

The liquid-crystal mixture exhibits good contrast and low viewing-angle dependence in an ASM-PAD.

Example 2

| Abbreviation | % by wt. |
| --- | --- |
| PCH-502FF | 17.0 |
| CCP-302FF | 15.0 |
| CCP-502FF | 12.0 |
| CCP-21FF | 6.0 |
| CCP-31FF | 13.0 |
| CCH-35 | 20.0 |
| CCH-301 | 7.0 |
| PCH-53 | 10.0 |
| | 100.0 |

This composition has the following properties:

| | |
|---|---|
| T(N, I) | 87.0° C. |
| Δn (20° C., 589 nm) | 0.080 |
| Δε (20° C., 1 kHz) | −3.1 |
| $\epsilon_\|$ (20° C., 1 kHz) | 3.2 |
| $K_1$ (20° C.) | $17.0 \times 10^{-12}$N |
| $K_3/K_1$ (20° C.) | 1.05 |
| $V_0$ (20° C.) | 2.53 V |

This composition exhibits good contrast and also low viewing-angle dependence in an ASM-PAD.

Example 3

| Abbreviation | % by wt. |
|---|---|
| PCH-502FF | 14.0 |
| CCP-302FF | 14.0 |
| CCP-502FF | 14.0 |
| CCP-21FF | 5.0 |
| CCP-31FF | 11.0 |
| CH-35 | 2.0 |
| CH-43 | 3.0 |
| CCH-35 | 5.0 |
| CCH-301 | 11.0 |
| CCH-501 | 8.0 |
| CC-5-V | 4.0 |
| PCH-53 | 9.0 |
| | 100.0 |

This mixture has the following properties:

| | |
|---|---|
| T(N, I) | 85.5° C. |
| Δn (20° C., 589 nm) | 0.077 |
| Δε (20° C., 1 kHz) | −3.0 |
| $\epsilon_\|$ (20° C., 1 kHz) | 3.3 |
| $K_1$ (20° C.) | $15.4 \times 10^{-12}$N |
| $K_3/K_1$ (20° C.) | 1.08 |
| $V_0$ (20° C.) | 2.48 V |
| $t_{store}$ (−20° C.) | >1000 h |
| $t_{store}$ (−30° C.) | 840 h |
| $t_{store}$ (−40° C.) | 408 h | and exhibits excellent contrast and low viewing-angle dependence in an ASM-PAD.

Example 4

| Abbreviation | % by wt. |
|---|---|
| PCH-502FF | 14.0 |
| CCP-302FF | 14.0 |
| CCP-502FF | 14.0 |
| CCP-21FF | 6.5 |
| CP-302FF | 6.0 |
| CCH-34 | 5.0 |
| CCH-35 | 5.0 |
| CCH-301 | 10.0 |
| CCH-501 | 9.0 |
| CC-5-V | 4.5 |
| PCH-53 | 10.0 |
| CCPC-34 | 2.0 |
| | 100.0 |

This mixture has the following properties:

| | |
|---|---|
| T(N, I) | 84.5° C. |
| Δn (20° C., 589 nm) | 0.075 |
| Δε (20° C., 1 kHz) | −2.9 |
| $\epsilon_\|$ (20° C., 1 kHz) | 3.3 |
| $K_1$ (20° C.) | $15.4 \times 10^{-12}$N |
| $K_3/K_1$ (20° C.) | 1.03 |
| $V_0$ (20° C.) | 2.46 V |
| $t_{store}$ (−20° C.) | >1000 h |
| $t_{store}$ (−30° C.) | >1000 h | and exhibits good contrast and low viewing-angle dependence in ASM-PADs.

Example 5

| Abbreviation | % by wt. |
|---|---|
| PCH-504FF | 8.0 |
| CCP-302FF | 10.0 |
| CCP-502FF | 10.0 |
| CCP-21FF | 11.0 |
| CCP-31FF | 11.0 |
| CP-302FF | 10.0 |
| CCH-34 | 5.0 |
| CCH-35 | 5.0 |
| CCH-301 | 10.0 |
| PCH-53 | 20.0 |
| | 100.0 |

This mixture has the following properties:

| | |
|---|---|
| T(N, I) | 84.0° C. |
| Δn (20° C., 589 nm) | 0.080 |
| Δε (20° C., 1 kHz) | −2.7 |
| $\epsilon_\|$ (20° C., 1 kHz) | 3.2 |
| $K_1$ (20° C.) | $16.2 \times 10^{-12}$N |
| $K_3/K_1$ (20° C.) | 1.06 |
| $V_0$ (20° C.) | 2.61 V |
| $t_{store}$ (−20° C.) | >1000 h |
| $t_{store}$ (−30° C.) | >1000 h | and is highly suitable for ASM-PADs owing to low viewing-angle dependence of the good contrast and of the hues.

Example 6

| Abbreviation | % by wt. |
|---|---|
| PCH-504FF | 11.0 |
| CCP-302FF | 10.0 |
| CCP-502FF | 10.0 |
| CCP-21FF | 10.0 |
| CCP-31FF | 10.0 |
| CP-302FF | 8.0 |
| CH-35 | 3.0 |
| CCH-43 | 3.0 |
| CCH-3S | 5.0 |
| CCH-301 | 11.0 |
| CCH-501 | 8.0 |
| CC-5-V | 2.0 |
| PCH-53 | 9.0 |
| | 100.0 |

This mixture has the following properties:

| | |
|---|---|
| T(N, I) | 92° C. |
| Δn (20° C., 589 nm) | 0.0767 |
| Δε (20° C., 1 kHz) | −3.0 |
| $ε_{\parallel}$ (20° C., 1 kHz) | 3.3 |
| $K_1$ (20° C.) | $16.0 \times 10^{-12}$ N |
| $K_3/K_1$ (20° C.) | 1.05 |
| $V_0$ (20° C.) | 2.51 V | and exhibits good contrast and excellent viewing-angle dependence in PADs having an ASM structure.

Example 7

| Abbreviation | % by wt. |
|---|---|
| PCH-504FF | 11.0 |
| CCP-302FF | 10.0 |
| CCP-502FF | 10.0 |
| CCP-21FF | 10.0 |
| CCP-31FF | 10.0 |
| CP-302FF | 8.0 |
| CCH-301 | 11.0 |
| CCH-501 | 3.0 |
| PCH-53 | 17.0 |
| BCH-32 | 10.0 |
| | 100.0 |

This mixture has the following properties:

| | |
|---|---|
| T(N,I) | 86.0° C. |
| Δn (20° C., 589 nm) | 0.092 |
| Δε (20° C., 1 kHz) | −2.7 |
| $ε_{\parallel}$ (20° C., 1 kHz) | 3.3 |
| $K_1$ (20° C.) | $15.0 \times 10^{-12}$ N |
| $K_3/K_1$ (20° C.) | 1.05 |
| $V_0$ (20° C.) | 2.57 V |
| $t_{store}$ (−20° C.) | >1000 h |
| $t_{store}$ (−30° C.) | >1000 h | and is distinguished by good contrast and low viewing-angle dependence in ASM-PADs.

The preceding examples can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

What is claimed is:

1. In a plasma-addressed liquid-crystal display comprising a liquid-crystal mixture, the improvement wherein said liquid crystal mixture is a nematic liquid-crystal composition of negative dielectric anisotrophy comprising two or more liquid crystal compounds wherein said composition contains one or more compounds of formula I

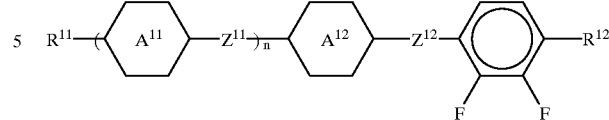

wherein
$R^{11}$ and $R^{12}$ are each, independently of one another, alkyl or alkoxy having 1 to 8 carbon atoms, or alkenyl, alkenyloxy or alkoxyalkyl having 2 to 8 carbon atoms;
$A^{11}$ and $A^{12}$ are in each case, independently of one another, a single bond, —(CH$_2$)$_2$—, trans—CH═CH— or —CH$_2$O;
$A^{11}$ and $A^{12}$ are in each case, independently of one another,
trans-1,4-cyclohexylene, 1,4-cyclohexenylene, in which 1 or 2
non-adjacent —CH$_2$— groups are replaced by oxygen atoms,
1,4-phenylene,
2-fluoro-1,4-phenylene,
3-fluoro-1,4-phenylene,
2,3-difluoro-1,4-phenylene,
3,5-difluoro-1,4-phenylene, 2,6-difluoro-1,4-phenylene, or
1,5-pyridyl or 1,5-pyrimidyl, in which one or two H atoms may be replaced by F; and
is 0, 1 or 2.

2. A liquid-crystal display according to claim 1, said display has axially symmetric microcells.

3. A display according to claim 1, wherein said composition further comprises one or more compounds of formula II

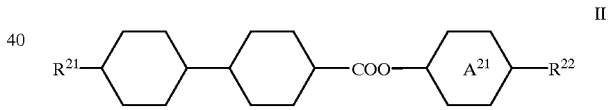

wherein
$R^{21}$ and $R^{22}$, independently of one another, are each alkyl or alkyloxy having 1 to 8 carbon atoms, or alkenyl, alkenyloxy or alkoxyalkyl having 2 to 8 carbon atoms, and
$A^{21}$ is trans-1,4-cyclohexylene, 1,4-phenylene, 3-fluoro-1,4-phenylene, 2-fluoro-1,4-phenylene or 2,3-difluoro-1,4-phenylene.

4. A display according to claim 1, wherein said composition further comprises one or more compounds of the formula III

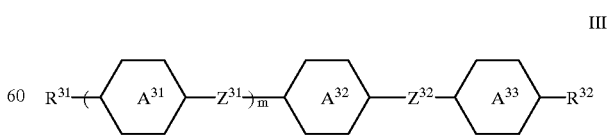

wherein
$R^{31}$ and $R^{32}$, independently of one another, are each alkyl or alkyloxy having 1 to 8 carbon atoms, or alkenyl, alkenyloxy or alkoxyalkyl having 2 to 8 carbon atoms;

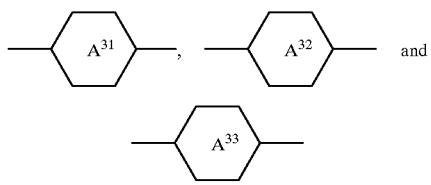

are in each case, independently of one another, trans-1,4-cyclohexylene, 1,4-phenylene, or 3-fluoro-1,4-phenylene or 2-fluoro-1,4-phenylene;

$Z^{31}$, $Z^{32}$ and $Z^{33}$ are in each case, independently of one another, $CH_2CH_2$, COO, OCO, $CH_2O$, $OCH_2$ or a single bond; and m is 0, 1 or 2 with the proviso that m is not 1 at the same time as

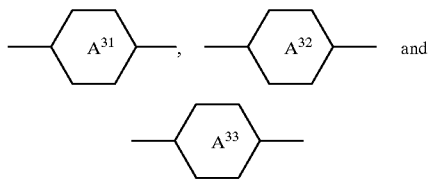 = trans-1,4-cyclohexylene, $Z^{31}$ is a single bond and $Z^{32}$ is COO.

5. A display according to claim 3, wherein said composition further comprises one or more compounds of the formula III

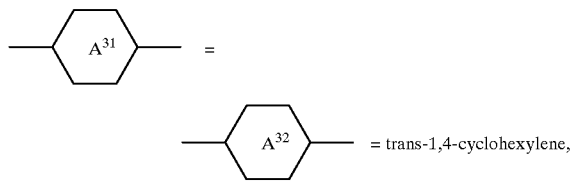    III wherein $R^{31}$ and $R^{32}$, independently of one another, are each alkyl or alkyloxy having 1 to 8 carbon atoms, or alkenyl, alkenyloxy or alkoxyalkyl having 2 to 8 carbon atoms;

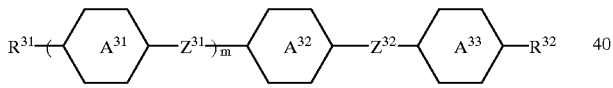

are in each case, independently of one another, trans-1,4-cyclohexylene, 1,4-phenylene, or 3-fluoro-1,4-phenylene or 2-fluoro-1,4-phenylene;

$Z^{31}$, $Z^{32}$ and $Z^{33}$ are in each case, independently of one another, $CH_2CH_2$, COO, OCO, $CH_2O$, $OCH_2$ or a single bond; and m is 0, 1 or 2 with the proviso that m is not 1 at the same time as

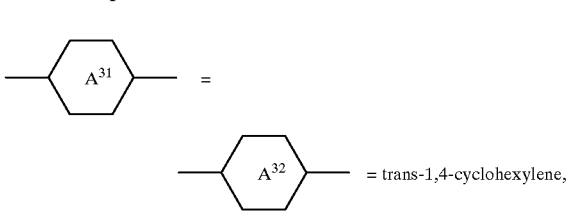 = trans-1,4-cyclohexylene, $Z^{31}$ is a single bond and $Z^{32}$ is COO.

6. A display according to claim 4, therein said composition comprises at least one compound of formula Ia and at least one compound of formula Ib

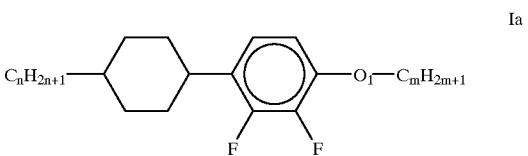    Ia

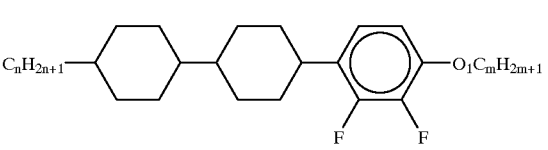    Ib wherein n and m are, in each case, independently of one another, an integer from 1 to 7, and l is 0 or 1.

7. A display according to claim 5, wherein said composition comprises at least one compound of formula Ia and at least one compound of formula Ib

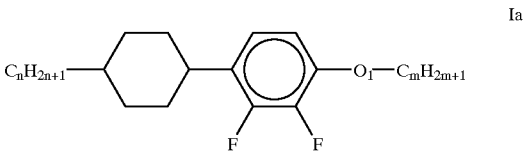    Ia

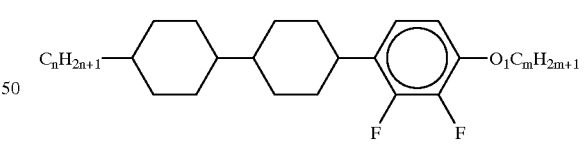    Ib wherein n and m are, in each case, independently of one another an integer from 1 to 7, and l is 0 or 1.

8. A display according to claim 4, wherein said composition comprises one or more compounds of the formula IIa and IId

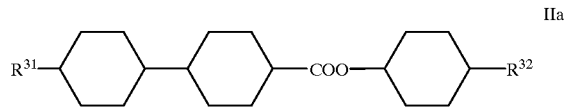    IIa

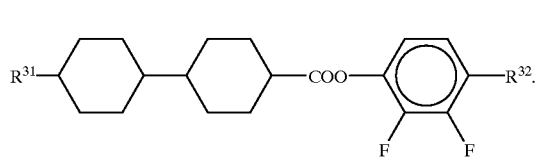
IId

9. A display according to claim 5, wherein said composition comprises one or more compounds of the formula IIa and IId

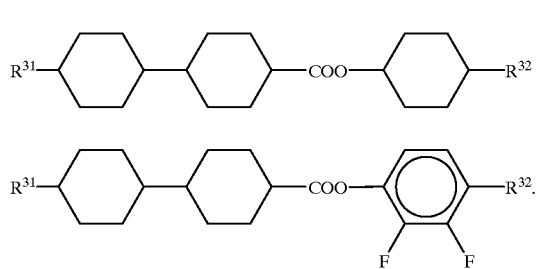

10. A display according to claim 6, wherein said composition comprises one or more compounds of the formula IIa and IId

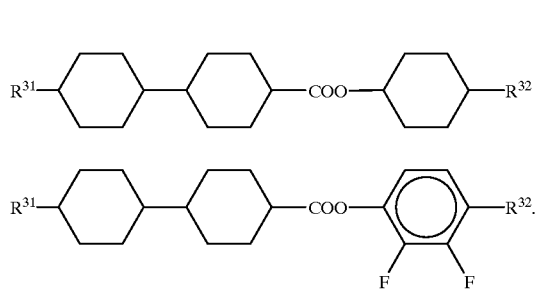

11. A display according to claims 7, wherein said composition comprises one or more compounds of the formula IIa and IId

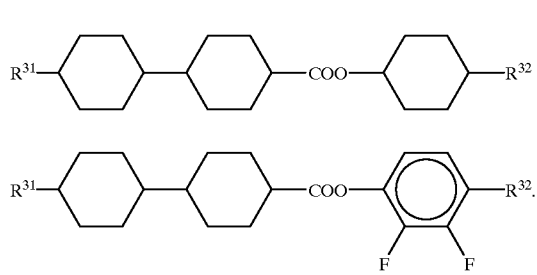

12. A display according to claim 4, wherein m is 0 or 1, $Z^{31}$ if present is a single bond, $Z^{32}$ is a single bond, ring $A^{31}$ if present is trans-1,4-cydohexylene or 1,4-phenylene, and rings $A^{32}$ and $A^{33}$ are each independently trans-1,4-cyclohexylene or 1,4-phenylene.

13. A display according to claim 4, wherein said composition contains one or more compounds of formula III1 to III2

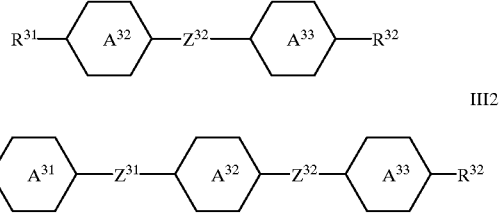

wherein $Z^{32}$ and $Z^{33}$ are in each case independently of one another —$CH_2CH_2$— or single bond; and rings $A^{31}$, $A^{32}$, and $A^{33}$ are in each case, independently of one another, trans-1,4-cyclohexylene, or 1,4-phenylene, and one of rings $A^{31}$, $A^{32}$ and $A^{33}$ can also be 2-fluoro-1,4-phenylene or 3-fluoro-1,4-phenylene.

14. A display according to claim 4, wherein said composition contains one or more compounds of formula III3

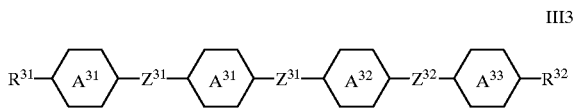

wherein one of $Z^{31}$ and $Z^{32}$ is —$CH_2CH_2$—, —COO— or a single bond and the other is a single bond; and $A^{31}$, $A^{32}$, and $A^{33}$ are in each case, independently, trans-1,4-cyclohexylene or 1,4-phenylene.

15. A display according to claim 11, wherein said composition contains one or more compounds of formulas IIa to IId

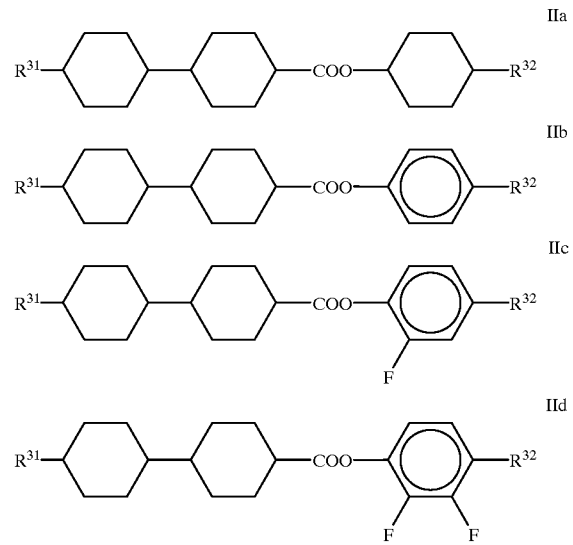

wherein $R^{31}$ and $R^{32}$ are in each case, independently of one another, n-alkyl having 1 to 5 carbon atoms.

16. A display according to claim 4, wherein said composition contains at least one compound of IIIa or IIIb

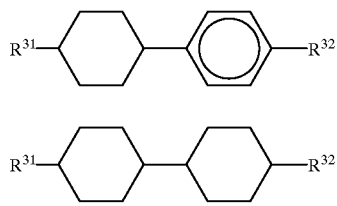
IIIa

IIIb wherein

R³¹ and R³² are each independent of one another alkyl having 3 to 5 carbon atoms.

17. A display according to claim 4, wherein said composition contains one or more compounds selected from the group consisting of the compounds of formulae III1a to III1d:

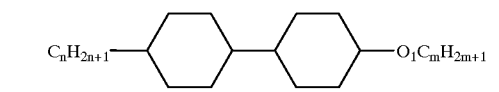
III1a

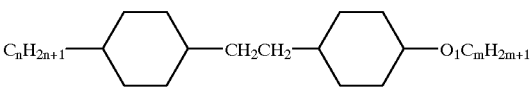
III1b

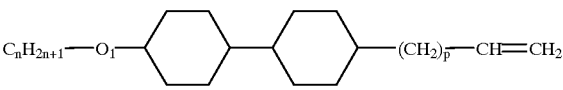
III1c

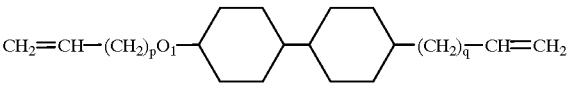
III1d wherein n and m are in each case independently an integer from 1 to 7, l is in each case independently 0 or 1, and p and q are in each case independently an integer from 0 to 3.

18. A display according to claim 4, wherein said composition contains one or more compounds of formulae III3a to III3d:

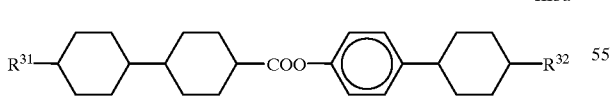
III3a

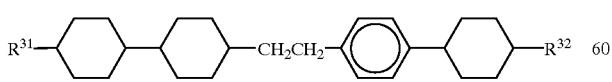
III3b

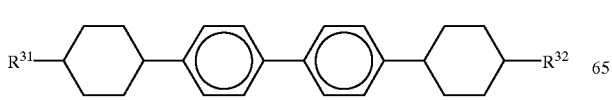
III3c

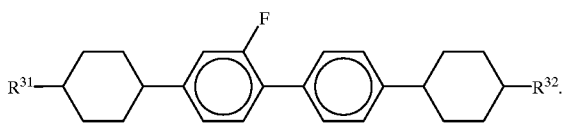
III3d

19. A display according to claim 2, wherein said composition further comprises one or more compounds of formula II

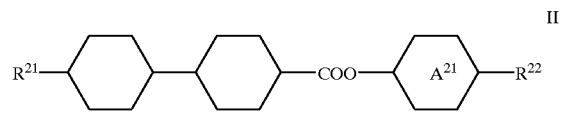
II wherein

R²¹ and R²², independently of one another, are each alkyl or alkyloxy having 1 to 8 carbon atoms, or alkenyl, alkenyloxy or alkoxyalkyl having 2 to 8 carbon atoms, and A²¹ is trans-1,4-cyclohexylene, 1,4-phenylene, 3-fluoro-1,4-phenylene, 2-fluoro-1,4-phenylene or 2,3-difluoro-1,4-phenylene.

20. A display according to claim 2, wherein said composition further comprises one or more compounds of the formula III

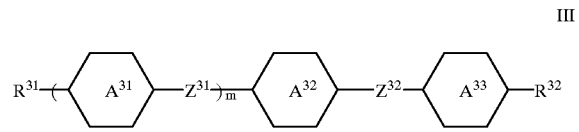
III wherein

R³¹ and R³², independently of one another, are each alkyl or alkyloxy having 1 to 8 carbon atoms, or alkenyl, alkenyloxy or alkoxyalkyl having 2 to 8 carbon atoms;

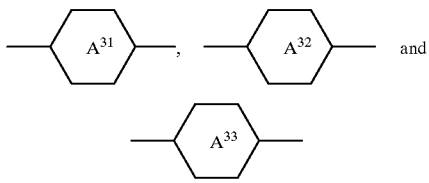

are in each case, independently of one another, trans-1,4-cyclohexylene, 1,4-phenylene, or 3-fluoro-1,4-phenylene or 2-fluoro-1,4-phenylene;

Z³¹, Z³² and Z³³ are in each case, independently of one another, CH₂CH₂, COO, OCO, CH₂O, OCH₂ or a single bond; and m is 0, 1 or 2 with the proviso that m is not 1 at the same time as

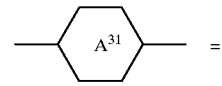
=

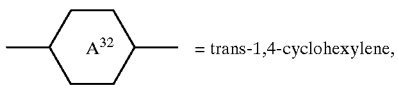 = trans-1,4-cyclohexylene, $Z^{31}$ is a single bond and $Z^{32}$ is COO.

21. A display according to claim 19, further comprising one or more compounds of the formula III

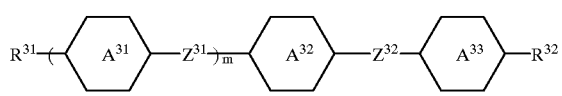

III wherein $R^{31}$ and $R^{32}$, independently of one another, are each alkyl or alkyloxy having 1 to 8 carbon atoms, or alkenyl, alkenyloxy or alkoxyalkyl having 2 to 8 carbon atoms;

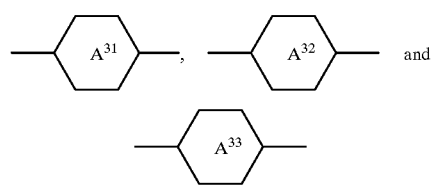

are in each case, independently of one another, trans-1,4-cyclohexylene, 1,4-phenylene, or 3-fluoro-1,4-phenylene or 2-fluoro-1,4-phenylene;

$Z^{31}$, $Z^{32}$ and $Z^{33}$ are in each case, independently of one another, $CH_2CH_2$, COO, OCO, $CH_2O$, $OCH_2$ or a single bond; and m is 0, 1 or 2 with the proviso that m is not 1 at the same time as

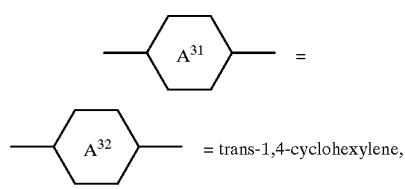 = trans-1,4-cyclohexylene, $Z^{31}$ is a single bond and $Z^{32}$ is COO.

22. A display according to claim 20, wherein said composition comprises at least one compound of formula Ia and at least one compound of formula Ib

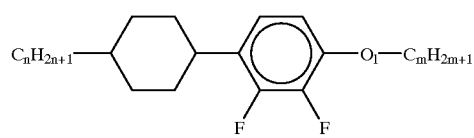

Ia

Ib

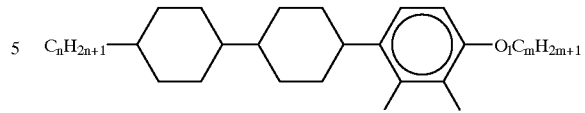

wherein n and m are, in each case, independently of one another, an integer from 1 to 7, and l is 0 or 1.

23. A display according to claim 21, wherein said composition comprises at least one compound of formula IIa and at least one compound of formula Ib Ia

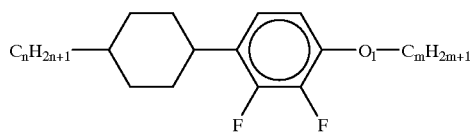

Ib

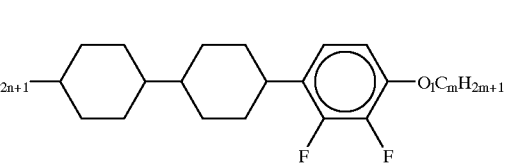

wherein n and m are, in each case, independently of one another an integer from 1 to 7, and l is 0 or 1.

24. A display according to claim 4, wherein said composition comprises one or more compounds of the formula IIa and IId IIa

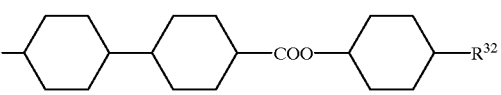

IId

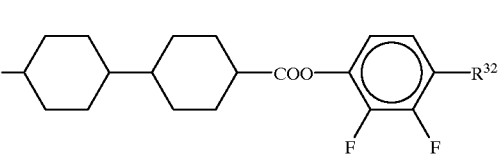

25. A display according to claim 21, wherein said composition comprises one or more compounds of the formula IIa and IId IIa

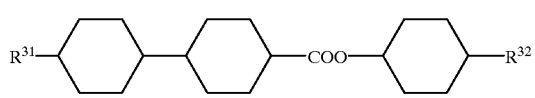

IId

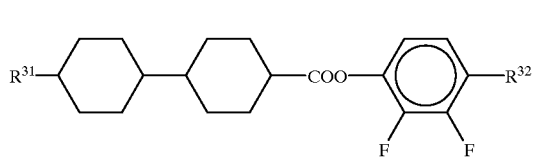

26. A display according to claim 22, wherein said composition comprises one or more compounds of the formula IIa and IId

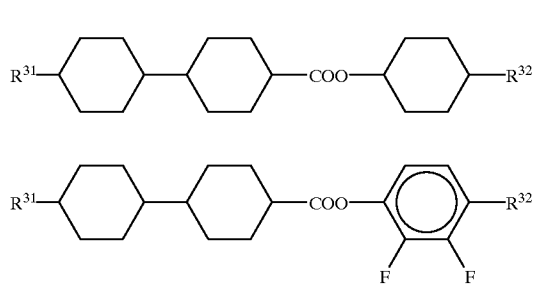

27. A display according to claim 20, wherein said composition comprises one or more compounds of the formula IIa and IId

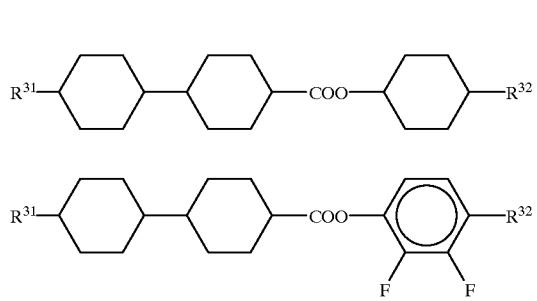

28. A liquid-crystal composition according to claim 20, wherein m is 0 or 1, $Z^{31}$ if present is a single bond, $Z^{32}$ is a single bond, ring $A^{31}$ if present is trans-1,4-cyclohexylene or 1,4-phenylene, and rings $A^{32}$ and $A^{33}$ are each independently trans-1,4-cyclohexylene or 1,4-phenylene.

29. A display according to claim 20, wherein said composition contains one or more compounds of formula III1 to III2:

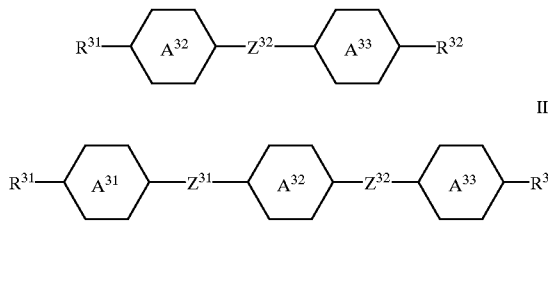

wherein $Z^{32}$ and $Z^{33}$ are in each case independently of one another —CH$_2$CH$_2$— or single bond; and rings $A^{31}$, $A^{32}$, and $A^{33}$ are in each case, independently of one another, trans-1,4-cyclohexylene, or 1,4-phenylene, and one of rings $A^{31}$, $A^{32}$ and $A^{33}$ can also be 2-fluoro-1,4-phenylene or 3-fluoro-1,4-phenylene.

30. A display according to claim 27, wherein said composition contains one or more compounds of formula III3:

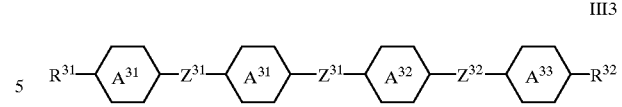

wherein one of $Z^{31}$ and $Z^{32}$ is —CH$_2$CH$_2$—, —COO— or a single bond and the other is a single bond; and $A^{31}$, $A^{32}$, and $A^{33}$ are in each case, independently, trans-1,4-cyclohexylene or 1,4-phenylene.

31. A display according to claim 20, wherein said composition contains one or more compounds of formulas IIa to IId:

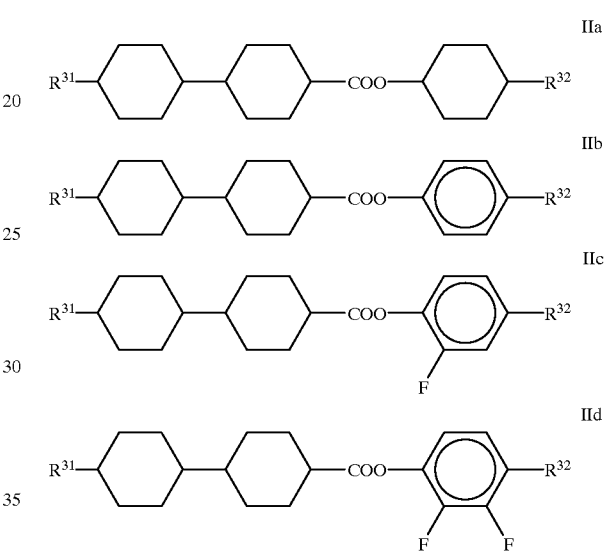

wherein $R^3$ and $R^{32}$ are in each case, independently of one another, n-alkyl having 1 to 5 carbon atoms.

32. A display according to claim 20, wherein said composition contains at least one compound of IIIa or IIIb:

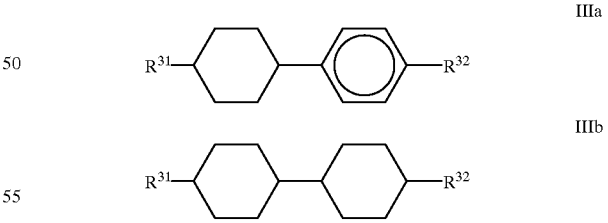

wherein $R^{31}$ and $R^{32}$ are each independent of one another alkyl having 3 to 5 carbon atoms.

33. A display according to claim 20, wherein said composition contains one or more compounds selected from the group consisting of the compounds of formulae III1a to III1d:

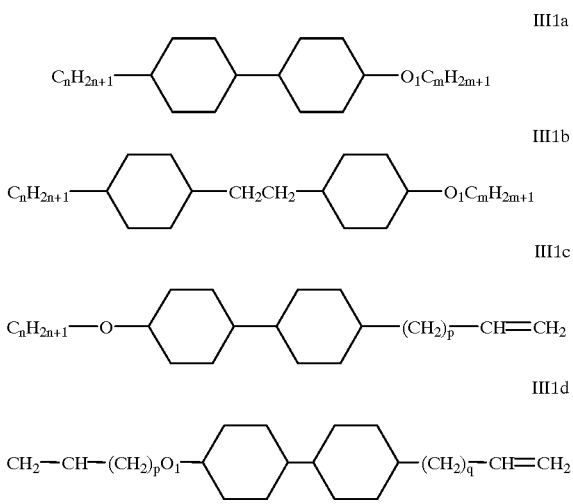

IIIa

IIIb

IIIc

IIId wherein n and m are in each case independently an integer from 1 to 7, l is in each case independently 0 or 1, and p and q are in each case independently an integer from 0 to 3.

34. A display according to claim 20, wherein said composition contains one or more compound of formulae III3a to III3d;

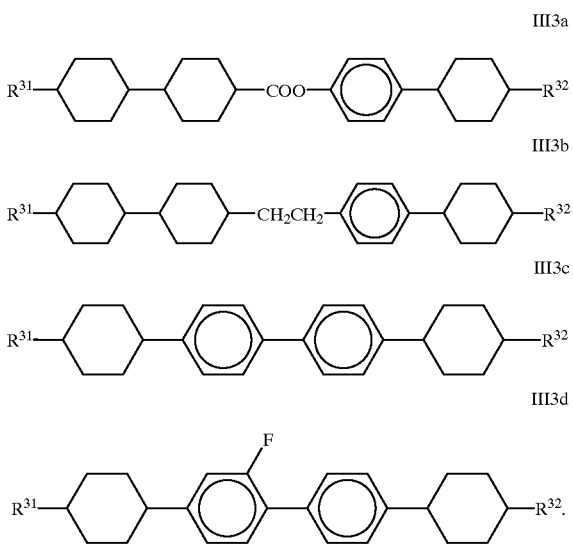

III3a

III3b

III3c

III3d

35. A display according to claim 1, wherein said mixture contains at least 10 wt. % of compounds of formula I.

36. A display according to claim 1, wherein said composition comprises at least one compound of formula Ia

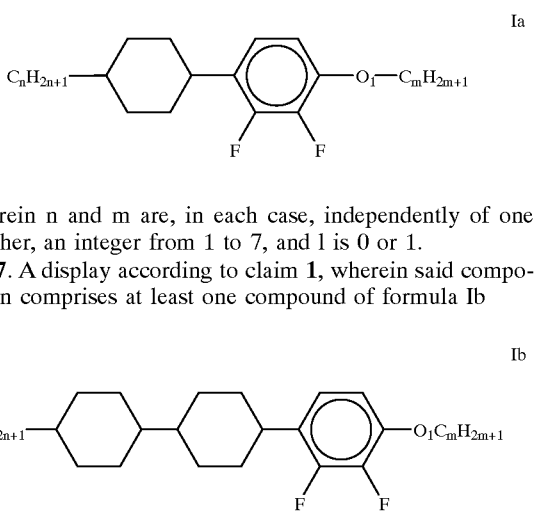

Ia wherein n and m are, in each case, independently of one another, an integer from 1 to 7, and l is 0 or 1.

37. A display according to claim 1, wherein said composition comprises at least one compound of formula Ib Ib wherein n and m are, in each case, independently of one another, an integer from 1 to 7, and l is 0 or 1.

38. A display according to claim 36, wherein said composition comprises at least one compound of formula Ib

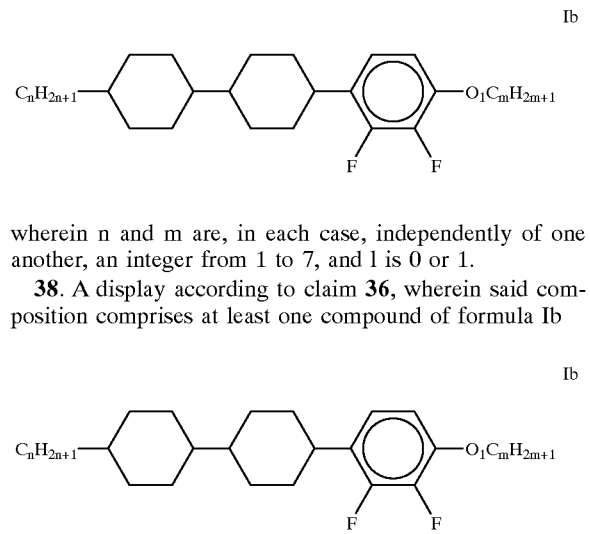

Ib wherein n and m are, in each case, independently of one another, an integer from 1 to 7, and l is 0 or 1.

39. A display according to claim 1, wherein said composition comprises at least one compound of formula IIa and at least one compound of formula Ib

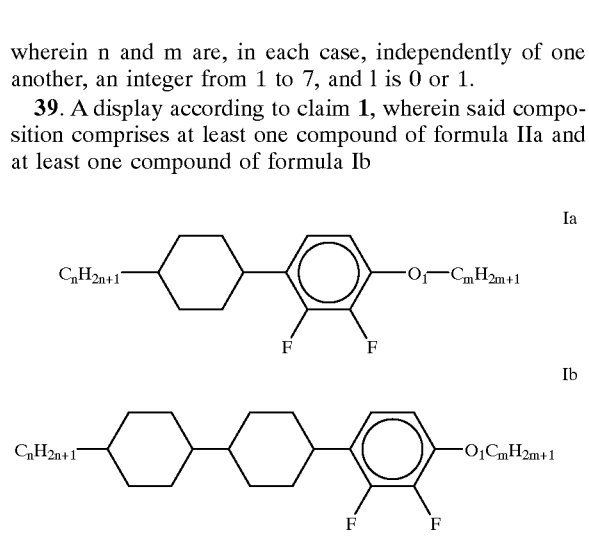

Ia

Ib wherein n and m are, in each case, independently of one another an integer from 1 to 7, and l is 0 or 1.

* * * * *